US010826704B2

(12) United States Patent
Burke et al.

(10) Patent No.: US 10,826,704 B2
(45) Date of Patent: Nov. 3, 2020

(54) BLOCKCHAIN KEY STORAGE ON SIM DEVICES

(71) Applicant: Hewlett Packard Enterprise Development LP, Houston, TX (US)

(72) Inventors: Paul Michael Burke, Bedford, NH (US); Warner Lee Hines, Southlake, TX (US); Giorgio A Curatolo, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/120,202

(22) Filed: Aug. 31, 2018

(65) Prior Publication Data

US 2020/0076606 A1  Mar. 5, 2020

(51) Int. Cl.
*H04L 9/08* (2006.01)
*H04L 9/32* (2006.01)
(Continued)

(52) U.S. Cl.
CPC .......... *H04L 9/3234* (2013.01); *H04L 9/0897* (2013.01); *H04L 63/0853* (2013.01);
(Continued)

(58) Field of Classification Search
CPC ... H04L 9/0897; H04L 63/0853; H04W 12/06
(Continued)

(56) References Cited

U.S. PATENT DOCUMENTS

2013/0103591 A1*  4/2013  Wheeler ................ G06F 21/34
                                                         705/64
2014/0165170 A1*  6/2014  Dmitriev ................ H04L 63/08
                                                         726/7
(Continued)

FOREIGN PATENT DOCUMENTS

CN         107453862      12/2017
IN      201641018199      12/2017
(Continued)

OTHER PUBLICATIONS

Save Encryption Keys on Sim Card (e.g. Draft Sms), Jolla Ltd, Dec. 27, 2013, 2 Pgs. https://together.jolla.com/question/3099/save-encryption-keys-on-sim-card-eg-draft-sms/.

*Primary Examiner* — Teshome Hailu
(74) *Attorney, Agent, or Firm* — Sheppard Mullin Richter & Hampton (57) ABSTRACT

The disclosure relates to storing a blockchain private key on a SIM device and securing the blockchain private key through multi-factor authentication. Various layers of security that controls access to the blockchain private key on the SIM device may be employed. These layers may include authentication of the user device on the cellular network using the SIM device, storage on a hidden partition of the SIM device that only a key applet executing on the SIM device or on a user device processor is aware of, storage of the blockchain private key in encrypted form, and/or use of the key applet to enforce credentialed access to the blockchain private key (e.g., the key applet obtains from the
(Continued)

hidden partition and/or decrypts the blockchain private key only if a valid passcode is supplied to it).

19 Claims, 6 Drawing Sheets

(51) Int. Cl.
*H04L 29/06* (2006.01)
*H04W 12/06* (2009.01)

(52) U.S. Cl.
CPC ......... *H04L 63/0884* (2013.01); *H04W 12/06* (2013.01); *H04L 2463/082* (2013.01)

(58) Field of Classification Search
USPC .......................................................... 713/172
See application file for complete search history.

(56) References Cited

U.S. PATENT DOCUMENTS

| | | | |
|---|---|---|---|
| 2014/0165770 A1* | 6/2014 | Abri | G06F 3/016 74/490.01 |
| 2015/0281362 A1* | 10/2015 | Shanmugam | H04L 67/12 709/217 |
| 2015/0324789 A1 | 11/2015 | Dvorak et al. | |
| 2016/0337853 A1* | 11/2016 | Abdulrahiman | H04L 63/0853 |
| 2017/0279801 A1 | 9/2017 | Andrade | |
| 2018/0152297 A1 | 5/2018 | Fielding et al. | |
| 2019/0037401 A1* | 1/2019 | Egner | H04W 12/08 |
| 2019/0121988 A1* | 4/2019 | van de Ruit | G06F 21/602 |

FOREIGN PATENT DOCUMENTS

| | | |
|---|---|---|
| WO | WO-2017006134 A1 | 1/2017 |
| WO | WO-2017066002 A1 | 4/2017 |

\* cited by examiner

BLOCKCHAIN KEY STORAGE ON SIM DEVICES

BACKGROUND OF THE INVENTION

Subscriber Identity Module ("SIM") devices such as SIM cards or Universal Integrated Circuit Cards ("UICCs") are used to store details about the device endpoint, including the International Mobile Subscriber Identity ("IMSI"), Mobile Station International Subscriber Directory Number ("MSISDN"), carrier preference details, and a shared network authentication key such as a Ki. The Ki is used to calculate authentication vectors which must match the vector calculated by mobile carrier infrastructure to allow it to securely connect to the mobile network. This exchange authenticates the device that possesses the SIM device, not necessarily the user of the device.

Blockchains make use of blockchain Public Key Infrastructure ("PKI") technology, which uses a blockchain private key provided by a Certificate Authority, which is used to encrypt ledger entries, and then a blockchain public key which can be publicly distributed to consumers is used to decrypt the blockchain ledger entry. This allows private data to be stored in the ledger and then via the blockchain public key, decryption is facilitated via the application providing a blockchain public key to the consumer. If the blockchain private key is stolen, then the holder of the private key may be impersonated on the blockchain network. However, securing the private key, which is usually stored locally at a user device, can be challenging. These and other problems exist with conventional blockchain key storage.

DETAILED DESCRIPTION

In accordance with various embodiments, a blockchain private key is secured through storage on a SIM device and multi-factor authentication. As such, various layers of security that controls access to the blockchain private key on the SIM device may be employed. These layers may include authentication of the user device on the cellular network using the SIM device, storage on a hidden partition of the SIM device that only a key applet executing on the SIM device or on a user device processor is aware of, storage of the blockchain private key in encrypted form, and/or use of the key applet to enforce credentialed access to the blockchain private key (e.g., the key applet obtains from the hidden partition and/or decrypts the blockchain private key only if a valid passcode is supplied to it).

Figure 1:
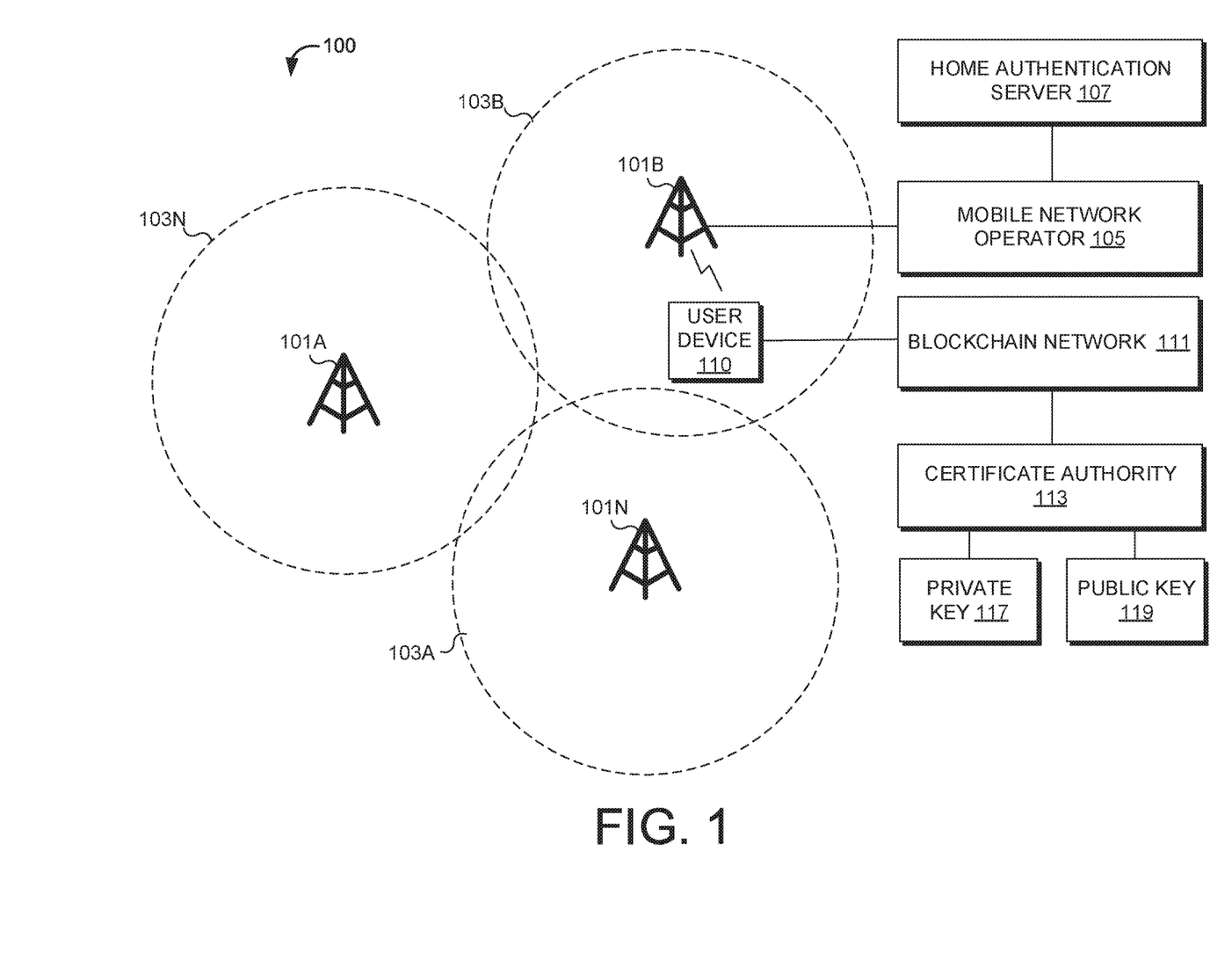
FIG. 1 illustrates an example of a system of storing blockchain keys on SIM devices for access to a blockchain network, according to an implementation of the disclosure.

FIG. 1 illustrates an example of a system 100 of storing blockchain keys on SIM devices for access to a blockchain network, according to an implementation of the disclosure. System 100 may include a Mobile Network Operator ("MNO") 105 that operates one or more base stations 101 (illustrated in FIG. 1 as base stations 101A-N). Each of the base stations 101 may provide cellular service (such as data, voice, and/or other network services) through respective cell service ranges 103 (illustrated in FIG. 1 as cell service ranges 103A-N). When a user device 110 enters a cell service range 103, such as when the user device 110 is powered on or is moved to the cell service range, the user device 110 may request to join the cellular network of the MNO 105. For example, the user device 110 may transmit, to the corresponding base station 101, a request for authentication by the home authentication server 107. The request may include identification information used to identify the subscriber and/or the MNO to which a subscriber has subscribed to cellular service. If the user subscribed to use the MNO 105, then the MNO 105 will use its own home authentication server 107 to authenticate the user. Otherwise, the user is said to be "roaming" on the MNO 105's cellular network, in which case the MNO 105 will look-up the appropriate authentication server 107. In this sense, when the subscriber is roaming, the MNO 105 may act as a proxy to authenticate the requesting user device 110 using the subscriber's MNO.

In some implementations, the home authentication server 107 may be configured as a Home Location Register ("HLR"), a Home Subscriber Server ("HSS"), or other type of authentication server depending on the MNO. The home authentication server 107 (either directly by the MNO 105 or using the MNO 105 as a proxy) may authenticate the requesting user device 110 in various ways. For instance, the home authentication server 107 may employ a challenge-response system in which the home authentication server 107 generates and provides a random number to the requesting user device 110. The requesting user device 110 may encrypt the random number using its subscriber authentication data 203 that includes an encryption key, sometimes known as a "Ki", and a predefined authentication algorithm. The Ki may be stored at both the user device 110 and the home authentication server 107 so that that the Ki itself is not transmitted over the network. The requesting user device 110 may then transmit the encrypted random number as its response to the home authentication server 107. The home authentication server 107 may perform the same encryption using the Ki of the subscriber and the same predefined authentication algorithm. If the encrypted result is the same as the response from the requesting user device 110 (such as based on a comparison of the two encrypted data), then the user device 110 is authenticated and the user device 110 is permitted to join the network. Otherwise, the user device 110 is determined to be unauthorized to join the network. As such, possession of the SIM device storing the authentication information provides at least a first factor for securing blockchain private keys, which is different than the authentication information such as Ki data, stored thereon. It should be noted that other forms of network authentication may be used as well.

In some implementations, the user device 110 may participate in a blockchain network 111. The blockchain network 111 may use Blockchain public key Infrastructure ("PKI") technology for data encryption and decryption. For instance, a certificate authority 113 associated with the blockchain network 111 may issue a blockchain private key 117 for use by the user device 110 to digitally sign (such as encrypt) data to be written to a decentralized ledger of the blockchain network. In some instances, the blockchain private key 117 may be 2048 or 4096 bits. The certificate authority 113 may issue a blockchain public key 119, corresponding to the blockchain private key 117, used to decrypt the encrypted data. Because only the blockchain public key 119 corresponding to the blockchain private key 117 may decrypt data encrypted by the blockchain private key, the data may be deemed authentically signed by the holder of the blockchain private key 117 if it is successfully decrypted using the blockchain public key. As such, it is important for a holder of the blockchain private key 117 to keep it secret so that the holder cannot be impersonated on the blockchain network 111.

Figure 2:
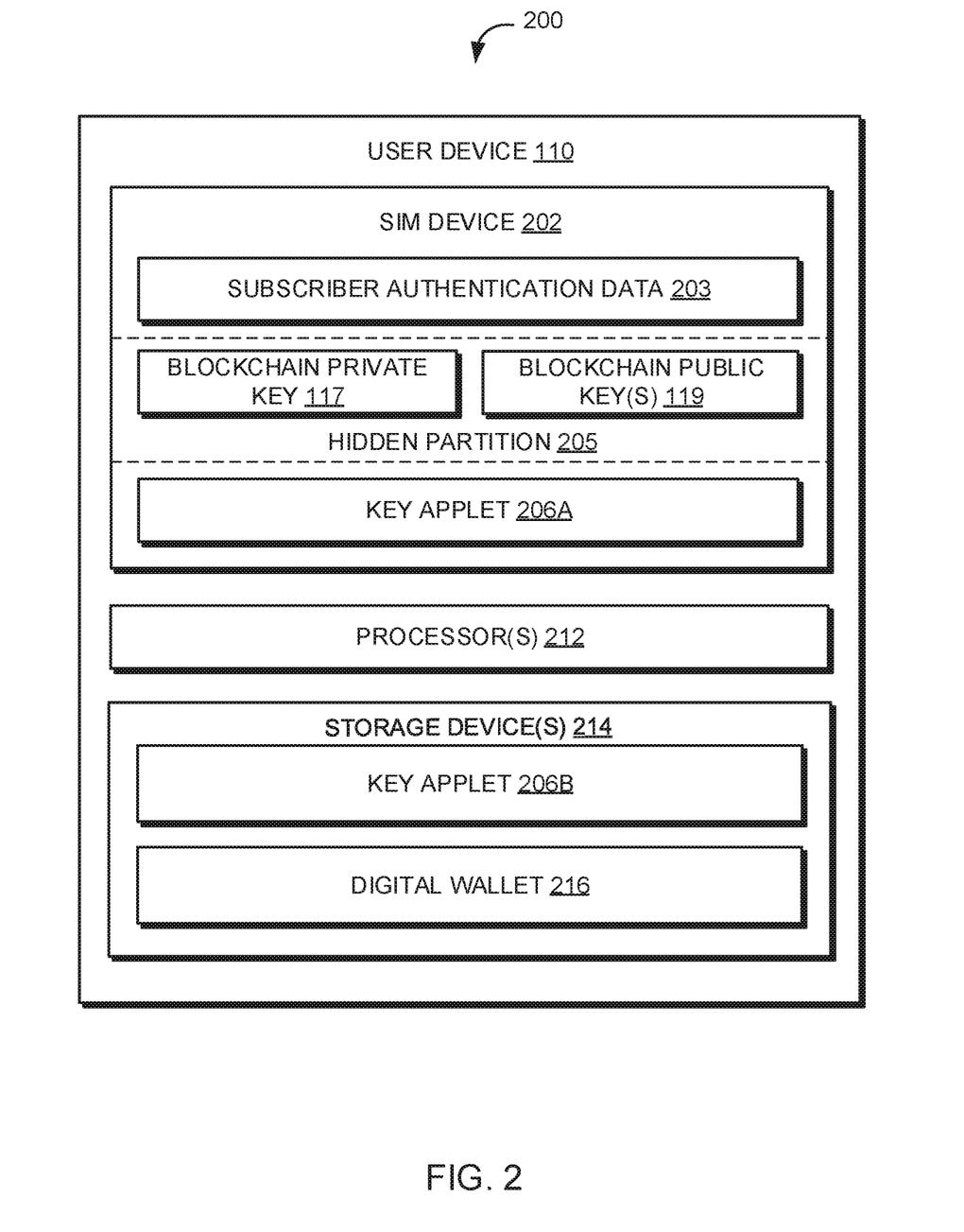
FIG. 2 illustrates an example of a user device that uses blockchain keys stored on a SIM device to participate in a blockchain network, according to an implementation of the disclosure.

FIG. 2 illustrates a user device 110 that stores one or more blockchain keys (such as blockchain private key 117 and blockchain public key 119) on a SIM device 202 for access to a blockchain network 111, according to an implementation of the disclosure.

The user device 110 may include a SIM device 202, one or more processors 212, one or more storage devices 214 (other than SIM device 202), and/or other components. The SIM device 202 may be removable from the user device 110 or may be non-removably integrated with the user device (such as by being soldered in). The SIM device 202 may include a storage that stores subscriber authentication data 203, the blockchain private key 117 and the blockchain public key 119, a key applet 206A, and/or other components. The subscriber authentication data 203 may be used to authenticate the subscriber. For instance, the subscriber authentication data 203 may include a Ki value or other secret information for a subscriber, as will be described below.

In some implementations, the SIM device 202 may store the blockchain private key 117 and the blockchain public key 119 on a hidden partition 205 of the storage of the SIM device. An electronic location of the hidden partition 205 on the SIM device 202 may be known to the key applet 206.

The key applet 206 may include an application executed at the SIM device 202 (illustrated in FIG. 2 as key applet 206A) and/or may be executed at the processor 212 (illustrated in FIG. 2 as key applet 206B). In either instance, the key applet 206 may provide similar functionality in providing access to the blockchain private key 117 (or blockchain public key 119 if it is stored in the SIM device 202 as well). The key applet 206 will be described in the context of the digital wallet 316 described below. It should be noted that when "key applet 206" is referred to below, this means that the functionality described may occur at the SIM device 202 and/or at the processor 212.

The one or more processor(s) 212 (also interchangeably referred to herein as processor(s) 212, processor(s) 212, or processor(s) 212 for convenience) may be programmed by one or more computer program instructions. For example, processor(s) 212 may be programmed by the key applet 206B, digital wallet 216, and/or other instructions, which may be stored at storage device(s) 214.

The digital wallet 216 may be used to interact with the blockchain network 111. For example, the digital wallet 216 may store or access all or a portion of a decentralized ledger of the blockchain network 111. The digital wallet 216 may be assigned with the blockchain public key 119. In this manner, it may be addressed by other nodes in the blockchain network 111. The digital wallet 216 may use the blockchain private key 117 to digitally sign transactions sent from the digital wallet 216 for validation and incorporation into the decentralized ledger. For instance, a transaction that transfers a unit of value (such as of a cryptocurrency like Bitcoin, Ether, and/or others) may be digitally signed by the digital wallet 216 with the blockchain private key 117. The digitally signed transaction may be decrypted using the corresponding blockchain public key 119, which is available publicly and is accessible by the blockchain network 111. In this manner, the blockchain network 111 may verify that a holder of the blockchain private key 117 has digitally signed the transaction.

As such, the blockchain private key 117 should be securely stored. However, if the blockchain private key 117 is exposed or is otherwise stolen from the digital wallet 216, then unauthorized transactions may be digitally signed by a malicious actor that uses the compromised or stolen blockchain private key 117 from another device.

The Key Applet

In some implementations, the key applet 206 may enforce multi-factor security of the blockchain private key 117. For example, prior to obtaining and/or decrypting the blockchain private key 117, the key applet 206 may require: the user device 110 has been authenticated on the cellular network through the SIM device (such as via the Ki challenge-response) and/or input of a valid credential such as a passcode to access the hidden partition of the SIM device 202.

The key applet 206 may determine whether the user device 120 has been authenticated by the home authentication server 107 as one factor in the multi-factor security of the blockchain private key 117. In some implementations, the key applet 206 may check the network status on-demand, such as by querying a network communication interface for a status of the network connection. In some implementations, each time the user device 120 is authenticated to join the cellular network, the key applet 206 may obtain a notification of such authentication. The key applet 206 may store an indication of the authentication (and remove or otherwise update the indication when the cellular connection is dropped). Prior to obtaining access to the blockchain private key 117, the key applet 206 may first check the indication of authentication. Only if authenticated (among other security factors) will the key applet 206 access the blockchain private key 117. In these implementations, the user device 120 may be required to be currently authenticated to connect to a cellular network (or at least recently have been authenticated with a predefined amount of time set by the key applet 206).

In some implementation, another factor in the multi-factor security of the blockchain private key 117 may include a requirement to supply the key applet 206 with a valid credential such as a passcode for accessing the blockchain private key. For example, the key applet 206 may receive a request for the blockchain private key 117 accompanied by the passcode. The passcode may be encoded in the key applet 206 or stored in the hidden partition 205 and/or other portion of the SIM device 202. In some instances, the passcode may be stored in another storage, such as storage device 214. Wherever it is stored for authentication by the key applet 206, the passcode may be stored in encrypted form.

In some implementations, access to data in the hidden partition 205 may be protected by a user credential such as a passcode, which is authenticated by the key applet 206. In some implementations, the blockchain private key 117 and/or blockchain public key 119 may be encrypted and can only be decrypted using a user credential. In this manner, the blockchain private key 117 may be hidden from browsing and/or protected using the user credential.

In some implementations, the key applet 206 may be operated by a user of the user device 120. For example, the key applet 206 may provide a graphical user interface for receiving a request and the passcode from the user. In these instances, the user may obtain the blockchain private key 117 and use it to digitally sign blockchain transactions. In some instances, the key applet 206, upon multi-factor authentication, may provide the blockchain private key 117 in a temporary cache of the user device 110 (such as at storage device 214 or other storage accessible to the user device) so that the digital wallet 216 may access the blockchain private key 117. In some of these implementations, the key applet 206 may delete the blockchain private key 117 after a specified time and/or the digital wallet 216 may be configured to delete the blockchain private key 117 from the cache after use.

In some implementations, the key applet 206 may be operated by another application, such as by digital wallet 216. In these implementations, the applications may communicate with each other via Inter-Process Communication ("IPC"). For example, the requesting application (such as the digital wallet 216) may provide the key applet 206 with an IPC message that encodes a request for the blockchain private key 117. The key applet 206 may respond with another IPC message with the blockchain private key 117 or an indication that it is available in a temporary storage location for the digital wallet 216 to retrieve.

It should be noted that the in some implementations, the key applet 206 may implemented by the digital wallet 216 itself. For example, the digital wallet 216 may provide the functions of key applet 2016 described herein to access the private blockchain key 117.

Figure 3:
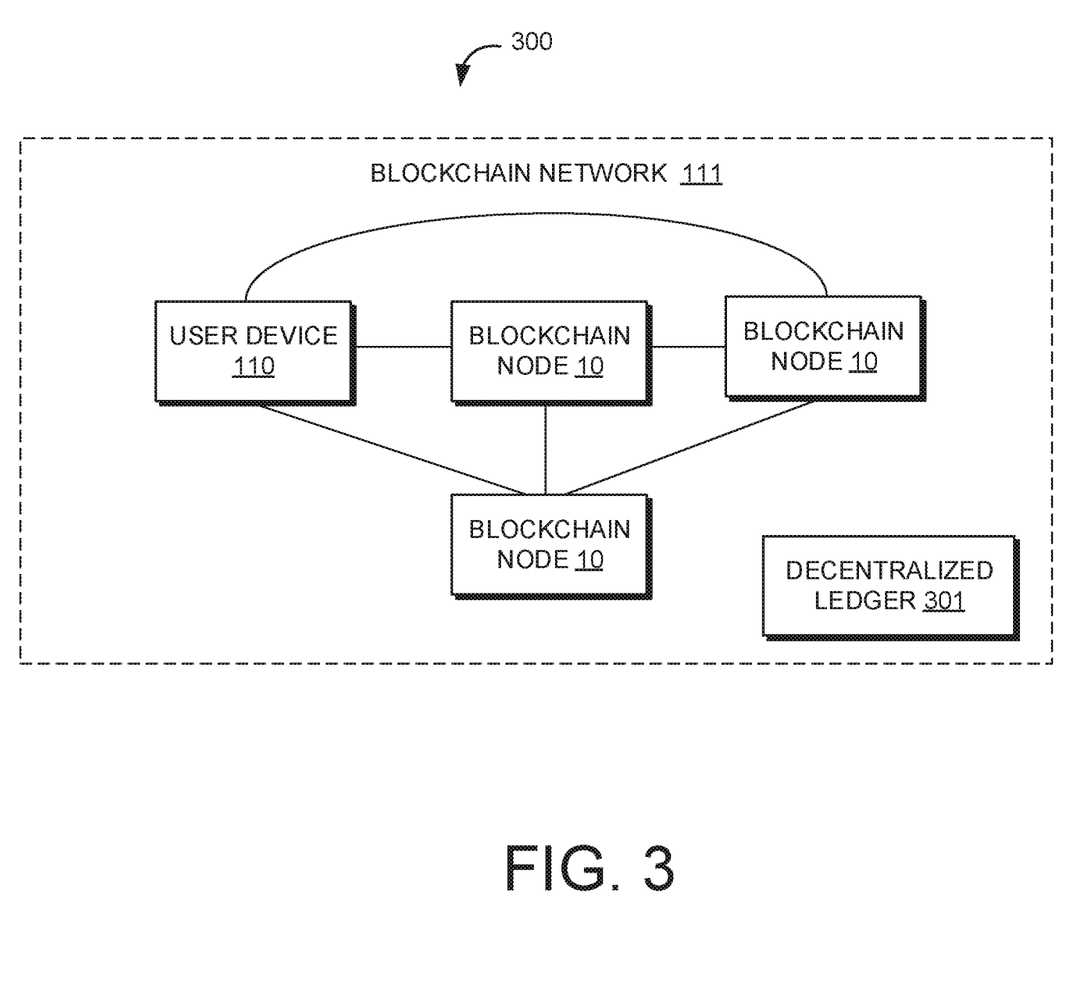
FIG. 3 illustrates a user device that stores blockchain keys on SIM devices for access to a blockchain network, according to an implementation of the disclosure.

FIG. 3 illustrates an example of a user device 110 that uses blockchain keys stored on a SIM device to participate in a blockchain network 101, according to an implementation of the disclosure. The user device 110 may operate as a full or partial node from among other blockchain nodes 10 in the blockchain network 111. For instance, each blockchain node 10 (including the user device 110) may store a full or partial copy of a decentralized ledger 301. The decentralized ledger 301 may be composed of multiple ledger blocks that each refer back to a prior block's hash. In this manner, the decentralized ledger 301 may have a set of chained ledger blocks. Each ledger block may include or refer to one or more blockchain transactions. Each of these blockchain transactions may be digitally signed by a blockchain private key, such as the blockchain private key 117 that is secured based on the disclosure herein. Thus, the user device 110 may provide blockchain transactions, signed by the blockchain private key 117 stored at the SIM device 202 for incorporation into a ledger block, which is then written to the decentralized ledger 301, a full or partial copy of which is stored at each of the blockchain nodes 10 (including user device 110).

Figure 4:
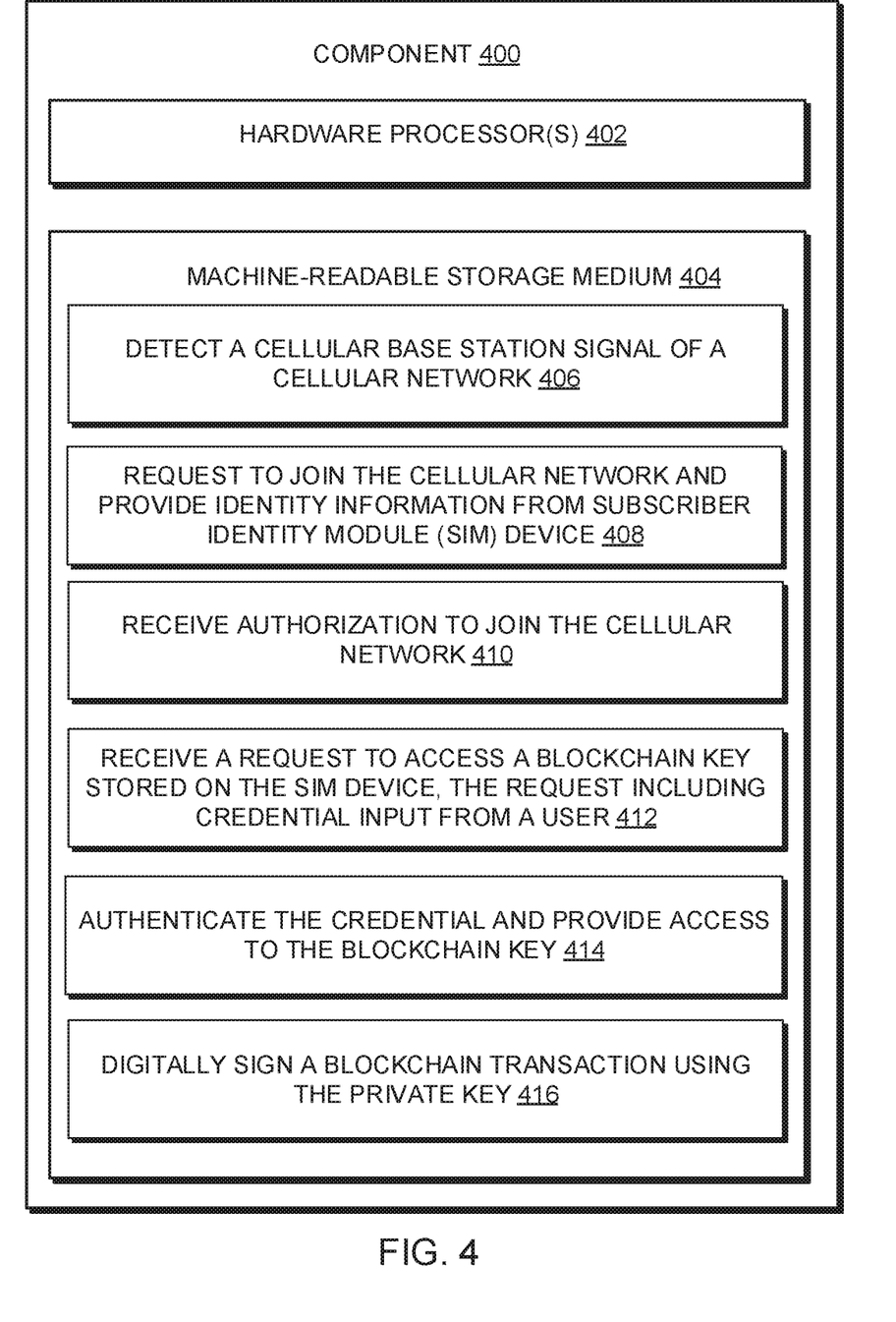
FIG. 4 is a block diagram of an example computing component or device for multi-factor authentication include authenticating with a cellular network via a SIM identity and secured access to the SIM for accessing blockchain keys stored thereon in accordance with one embodiment.

FIG. 4 is a block diagram of an example computing component or device 400 for multi-factor authentication include authenticating with a cellular network via a SIM identity and secured access to the SIM for accessing blockchain keys stored thereon in accordance with one embodiment.

Computing component 400 may be, for example, a server computer, a controller, or any other similar computing component capable of processing data. In the example implementation of FIG. 4, the computing component 400 includes a hardware processor 402, and machine-readable storage medium 404. In some embodiments, computing component 400 may be an embodiment of a user device 110, for example.

Hardware processor 402 may be one or more central processing units (CPUs), semiconductor-based microprocessors, and/or other hardware devices suitable for retrieval and execution of instructions stored in machine-readable storage medium, 404. Hardware processor 402 may fetch, decode, and execute instructions, such as instructions 406-416. As an alternative or in addition to retrieving and executing instructions, hardware processor 402 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 404, may be any electronic, magnetic, optical, or other physical storage device that contains or stores executable instructions. Thus, machine-readable storage medium 404 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 404 may be a non-transitory storage medium, where the term "non-transitory" does not encompass transitory propagating signals. As described in detail below, machine-readable storage medium 404 may be encoded with executable instructions, for example, instructions 406-416.

Hardware processor 402 may execute instruction 406 to detect a cellular base station 101 of a cellular network, which may be operated by an MNO 105. For example, a user device 110 may be moved to within range of the base station 101 or may have been powered on inside a cell service range 103 of the base station 101.

Hardware processor 402 may execute instruction 408 to request to join the cellular network and providing identity information from the SIM device 202. This may initiate an authorization process with the home authentication server 107. The authorization process may include a challenge-response in which the home authentication server 107 identifies the subscriber and obtains subscriber authentication data 203, which may include private data such as a Ki that is specific to the subscriber. The home authentication server 107 provides a random number to the requesting user device, which must then use its Ki or other private data specific to the subscriber to process the random number using a pre-defined algorithm. The home authentication server 107 may also process the random number with the Ki or other private data of the subscriber. If the result of processing is the same (e.g., both create the same encrypted or hashed file), then the subscriber (requesting user device) is authenticated and permitted to join the network.

Hardware processor 402 may execute instruction 410 to receive an authorization to join the network. Accordingly, the requesting user device may join the network.

Hardware processor 402 may execute instruction 412 to receive a request to access blockchain private key 117 stored at the SIM device. The request may include a credential such as a passcode from the user used to access the blockchain private key 117. The request may originate from a process at the requesting user device 120 that wishes to digitally sign a transaction for entry into a decentralized ledger. For example, and without limitation, the transaction may be related to a transfer of value from a digital wallet 316, such as to pay for an item or service.

Hardware processor 402 may execute instruction 414 to authenticate the credential. For example, the key applet 306A or 306B may authenticate the credential and then access the hidden partition 205 and/or decrypt the blockchain private key 117 responsive to the authenticated credential. In some instances, the key applet 306A or 306B may also require that the user device 120 is authenticated on the cellular network. In these implementations, the key applet 306A or 306B may determine whether the user device 120 has been or is currently authenticated to join the cellular network. If so, then the blockchain private key 117 may be obtained from the hidden partition 205 and/or decrypted. In this manner, the key applet 306A or 306B may enforce multi-factor authentication, leveraging both SIM device-based authentication to a cellular network and local credential-based authentication of (for example) a passcode to access the blockchain private key 117.

Hardware processor 402 may execute instruction 416 to digitally sign a blockchain transaction using the blockchain private key 117. The digitally signed transaction may be submitted to the blockchain network 111 for validation and addition to the decentralized ledger.

Figure 5:
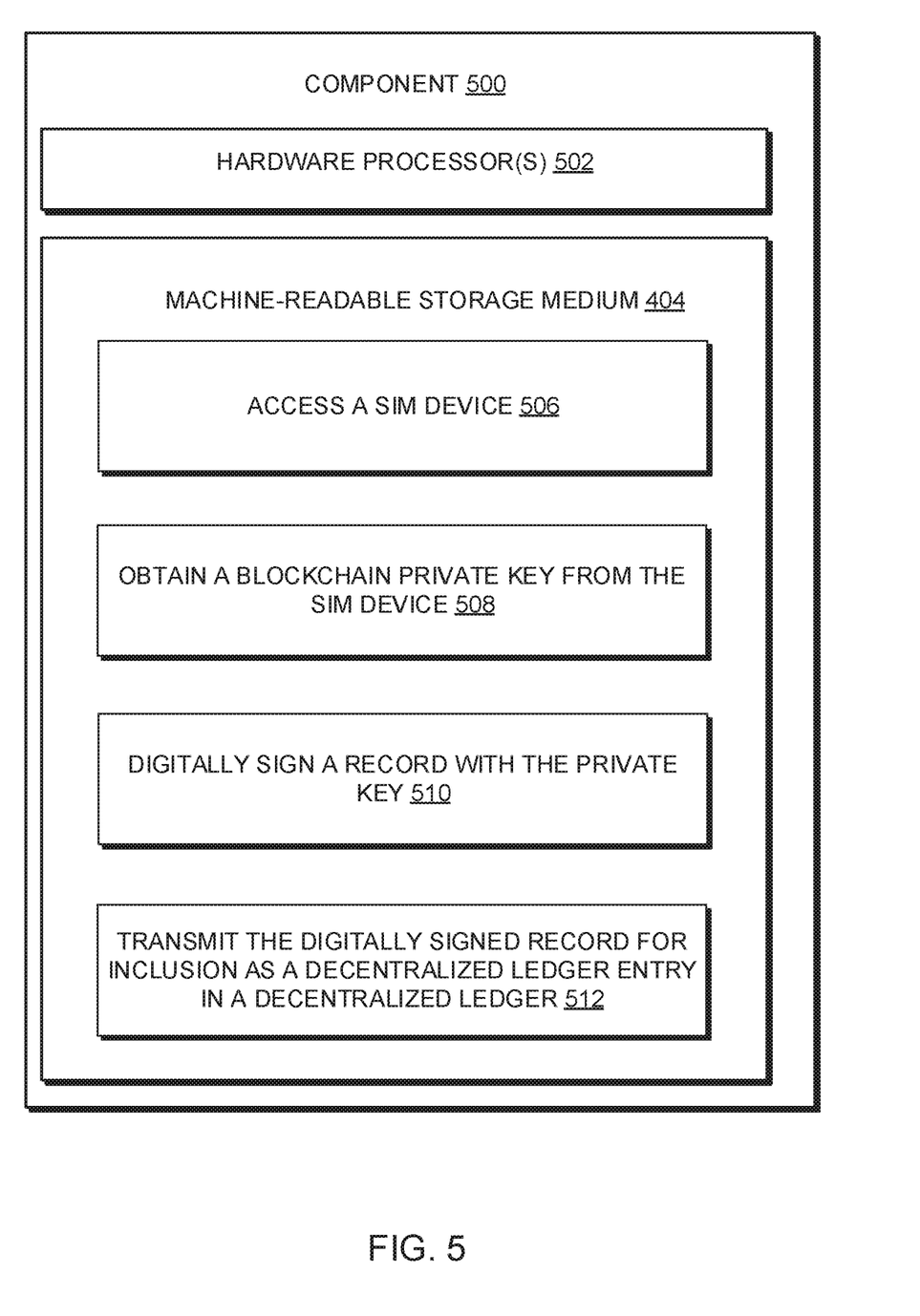
FIG. 5 is a block diagram of an example computing component or device for accessing blockchain keys from a SIM device in accordance with one embodiment.

FIG. 5 is a block diagram of an example computing component or device 500 for accessing blockchain keys from a SIM device in accordance with one embodiment. Computing component 500 may be, for example, a server computer, a controller, or any other similar computing component capable of processing data. In the example implementation of FIG. 5, the computing component 500 includes a hardware processor 502, and machine-readable storage medium 504. In some embodiments, computing component 500 may be an embodiment of a user device 110, for example.

Hardware processor 502 may be one or more central processing units (CPUs), semiconductor-based microprocessors, and/or other hardware devices suitable for retrieval and execution of instructions stored in machine-readable storage medium, 504. Hardware processor 502 may fetch, decode, and execute instructions, such as instructions 506-512, to control processes or operations for operating an EDG. As an alternative or in addition to retrieving and executing instructions, hardware processor 502 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 504, may be any electronic, magnetic, optical, or other physical storage device that contains or stores executable instructions. Thus, machine-readable storage medium 504 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 504 may be a non-transitory storage medium, where the term "non-transitory" does not encompass transitory propagating signals. As described in detail below, machine-readable storage medium 504 may be encoded with executable instructions, for example, instructions 506-512.

Hardware processor 502 may execute instruction 506 to access the SIM device 202.

Hardware processor 502 may execute instruction 508 to obtain a blockchain private key 117 from the SIM device 202 for digitally signing a record. Access to the blockchain private key 117 may be controlled by the key applet 206 using multi-factor authentication, which may include obfuscation. Thus, the key applet 206 may obtain the blockchain private key 117 after multiple authentication security features are applied. For example, one of the factors may include authenticating a requesting user device 110 based on the SIM device 202 at a carrier infrastructure. Such authentication may include obtaining an authentication from a HLR or HSS of the carrier infrastructure, which may use challenge response techniques. In some instances where the handling MNO is not the requesting user device's subscribed cellular network, authenticating the user device 110 may be made via an authentication proxy in which the handling MNO acts as the authentication proxy for the HLR or HSS of the subscribed-to MNO.

Another factor may include obtaining, by the key applet 206B executing on the user device 110, a user credential from the user and authenticating, by the key applet 206B, the user credential. In some instances, the authentication may include executing an authentication, authorization, and accounting function to authenticate the user credential. Another factor may include obtaining, by the key applet 206A executing on the SIM device 202, a user credential from the user and authenticating, by the key applet 206A, the user credential.

Another factor may include obfuscation by hiding the blockchain private key 117 in a hidden partition 205 of the SIM device 202. As such, the key applet 206 may obtain the blockchain private key from a hidden partition 205 of the SIM device 202. It should be noted that a combination of any one of the foregoing may be used in multi-factor authentication for authenticating access to the blockchain private key 117 stored on the SIM device 202.

Hardware processor 502 may execute instruction 510 to digitally sign the record with the blockchain private key.

Hardware processor 502 may execute instruction 512 to transmit the digitally signed record for inclusion as a distributed ledger entry in a distributed ledger.

The described operations, such as those illustrated in FIGS. 4 and 5 and described above, may be accomplished using some or all of the system components described in detail herein and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting. It is to be expressly understood that the drawings are for the purpose of illustration and description only and are not intended as a definition of the limits of the invention.

Figure 6:
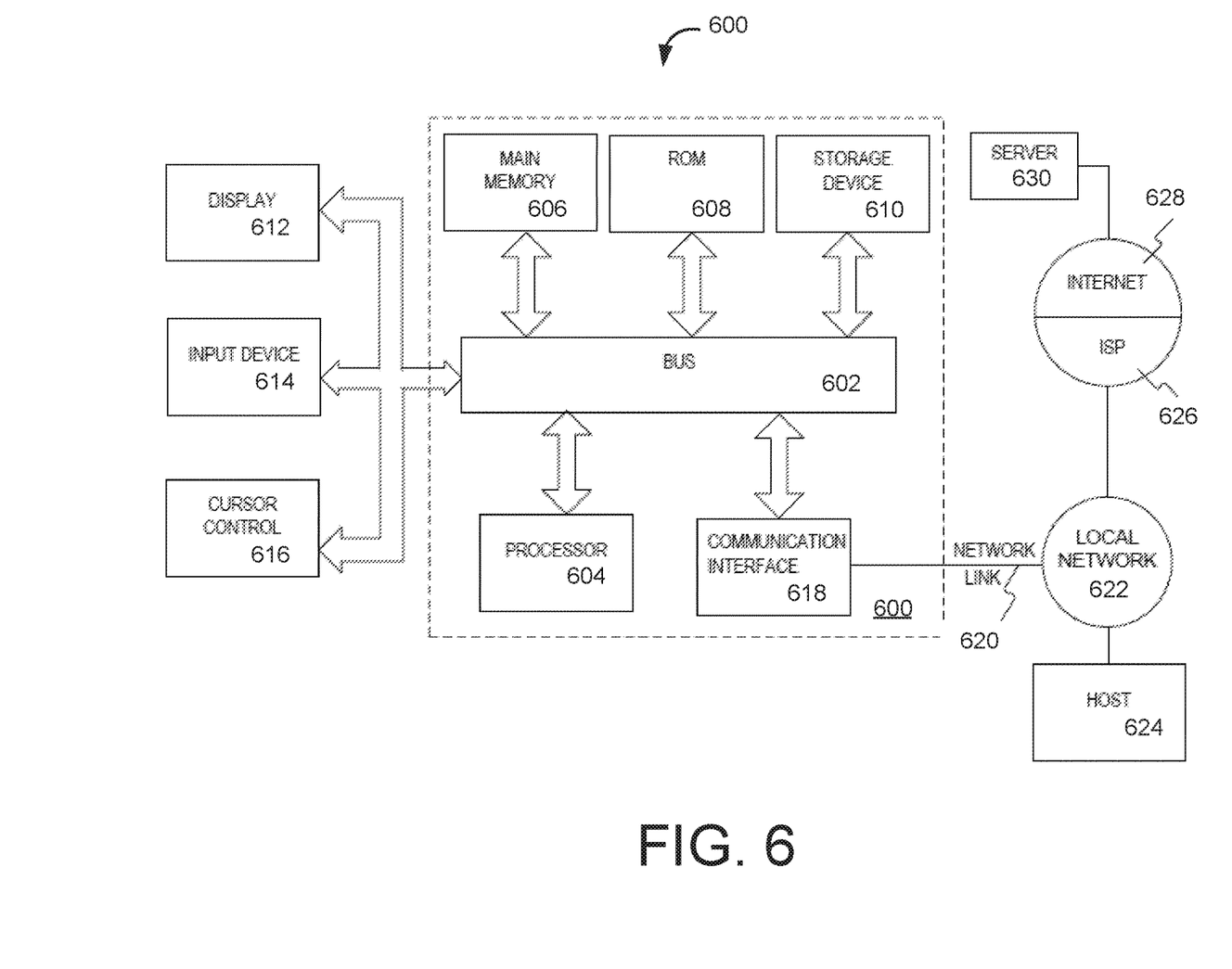
FIG. 6 depicts a block diagram of an example computer system in which any of the embodiments described herein may be implemented.

FIG. 6 depicts a block diagram of an example computer system in which any of the embodiments described herein may be implemented. The various components of system 100 illustrated in FIG. 1 may be implemented according to the computer system 600. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface component to implement a GUI that may be stored in a mass storage device as executable software codes that are executed by the computing device(s). This and other components may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, network interface 618 may be a local area network (LAN) card to provide a data communication connection to a compatible LAN (or WAN component to communicated with a WAN). Wireless links may also be implemented. In any such implementation, network interface 618 sends and receives electrical, electromagnetic or optical signals that carry digital data streams representing various types of information.

A network link 620 typically provides data communication through one or more networks to other data devices. For example, a network link may provide a connection through local network to a host computer 624 or to data equipment operated by an Internet Service Provider (ISP) 626. The ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server 630 might transmit a requested code for an application program through the Internet 628, the ISP 626, the local network 622 and the communication interface 618.

The received code may be executed by processor 604 as it is received, and/or stored in storage device 610, or other non-volatile storage for later execution.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A method comprising:
   accessing a Subscriber Identity Module ("SIM") device, wherein the SIM device comprises:
   an International Mobile Subscriber Identity (IMSI) and corresponding secret information that is specific to a user of the SIM device,
   a hidden partition of the SIM device that stores a blockchain private key and a blockchain public key, and
   a key applet configured to enforce credentialed access to the hidden partition of the SIM device;
   obtaining the blockchain private key from the hidden partition of the SIM device by the key applet for digitally signing a record;
   digitally signing the record with the blockchain private key; and
   transmitting the digitally signed record for inclusion as a distributed ledger entry in a distributed ledger.

2. The method of claim 1, the method further comprising: authenticating a user device of the user of the SIM device.

3. The method of claim 2, wherein authenticating the user device comprises obtaining an authentication associated with the authentication request from a home location register of a mobile carrier network.

4. The method of claim 2, wherein authenticating the user device comprises obtaining an authentication associated with the authentication request from a home subscriber service of a mobile carrier network.

5. The method of claim 2, the method further comprising:
   obtaining, by an application executing on the user device, a user credential from the user; and
   authenticating, by the application, the user credential, wherein accessing the SIM device is responsive to authenticating the user credential.

6. The method of claim 2, wherein authenticating the user device is via an authentication proxy to a mobile network operator (MNO) of a mobile carrier network.

7. The method of claim 2, the method further comprising:
   obtaining, by an application executing on the user device, a user credential from the user; and
   authenticating, by the application, the user credential by executing an authentication, authorization, and accounting function to authenticate the user credential.

8. The method of claim 1, wherein the blockchain private key is encrypted while stored in the hidden partition of the SIM device.

9. The method of claim 1, wherein the credentialed access to the hidden partition of the SIM device requires an encrypted passcode encoded in the key applet.

10. A user device comprising:
    a Subscriber Identity Module ("SIM") device that comprises:
    an International Mobile Subscriber Identity (IMSI) and corresponding secret information that is specific to a user of the SIM device,
    a hidden partition of the SIM device that stores a blockchain private key and a blockchain public key, and
    a key applet configured to enforce credentialed access to the hidden partition of the SIM device;
    one or more physical processors;
    wherein the key applet executing on either the SIM device or the one or more processors is configured to:
    receive an authentication request associated with joining a mobile carrier network,
    confirm the authentication request to join the mobile carrier network,
    access the hidden partition of the SIM device based on confirming the authentication request, and
    obtain the blockchain private key from the SIM device.

11. The user device of claim 10, wherein the key applet is further configured to:
    authenticate the user device of the user of the SIM device.

12. The user device of claim 11, wherein the authentication is from a home location register of the mobile carrier network.

13. The user device of claim 11, wherein the authentication is from a home subscriber service of the mobile carrier network.

14. The user device of claim 11, wherein the authentication is a multi-factor authentication that includes supplying the key applet with a valid passcode.

15. The user device of claim 11, wherein authenticating the user device is via an authentication proxy to a mobile network operator (MNO) of the mobile carrier network.

16. A Subscriber Identity Module ("SIM") device, comprising:
    an International Mobile Subscriber Identity (IMSI) and corresponding secret information that is specific to a user of the SIM device;
    a hidden partition of the SIM device that stores a blockchain private key and a blockchain public key;
    a storage that stores subscriber authentication data for authentication to cellular network via a challenge-response; and
    a key applet that is configured to enforce credentialed access to the hidden partition of the SIM device by:
    receive a request to access the blockchain private key, the request including an authentication credential;
    authenticate the authentication credential;
    access the blockchain private key from the hidden partition; and
    provide the blockchain provide key responsive to the request.

17. The SIM device of claim 16, wherein the key applet is further configured to:
    verify that the subscriber authentication data has been authenticated by the cellular network prior to the access and provision of the blockchain private key.

18. The SIM device of claim 17, wherein to verify that the subscriber authentication data has been authenticated by the cellular network, the key applet is further configured to:
    obtain an authentication from a home location register of the cellular network.

19. The SIM device of claim 17, wherein to verify that the subscriber authentication data has been authenticated by the cellular network, the key applet is further configured to:

obtain an authentication from a home subscriber service of the cellular network infrastructure.

* * * * *